March 5, 1935. M. L. HASELTON ET AL 1,992,945
LIMIT ORDER DEVICE
Filed Nov. 26, 1930 8 Sheets-Sheet 1

INVENTORS
Merton L. Haselton
Raymond M. Hicks
BY Ward, Crosby & Neal
ATTORNEYS

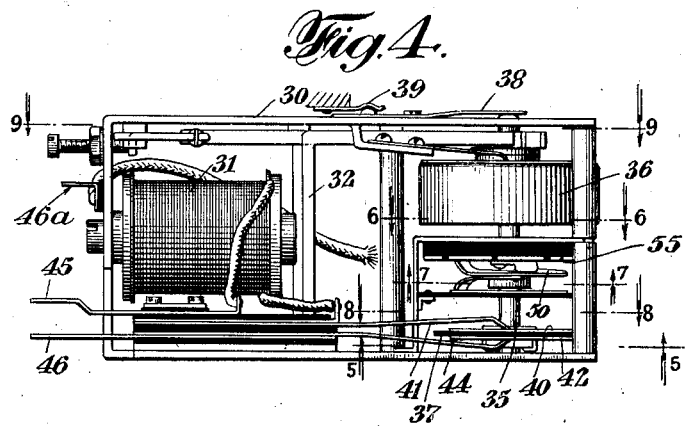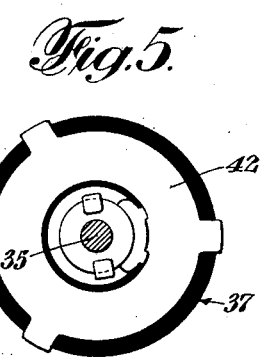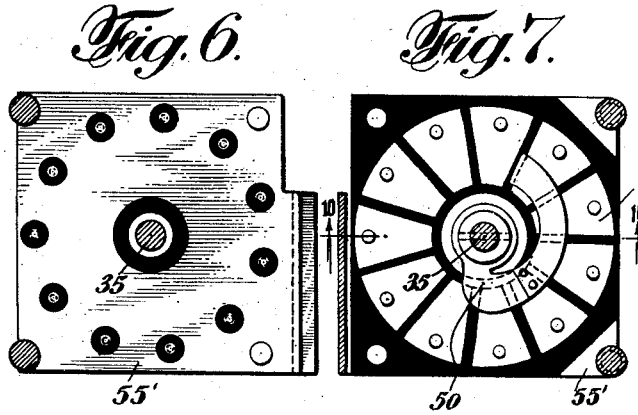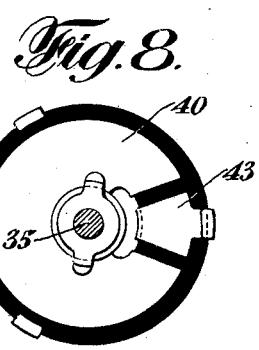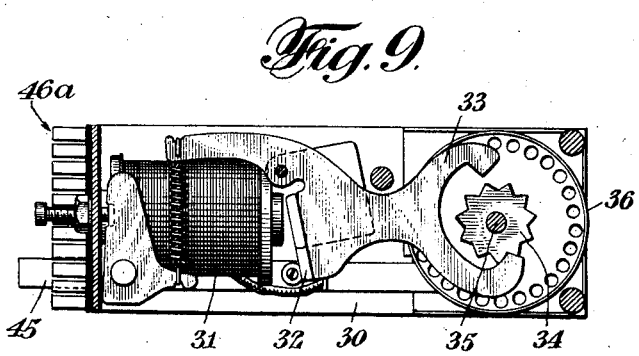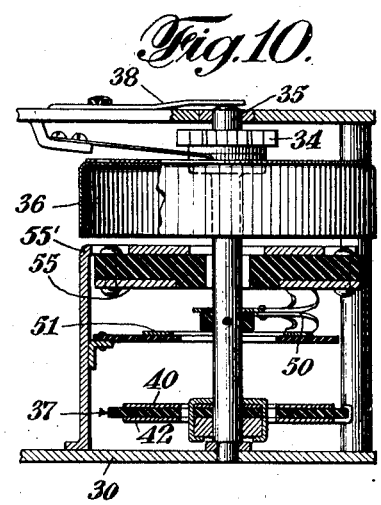

March 5, 1935.  M. L. HASELTON ET AL  1,992,945
LIMIT ORDER DEVICE
Filed Nov. 26, 1930  8 Sheets-Sheet 5

INVENTORS
*Merton L. Haselton*
*Raymond M. Hicks*
BY *Ward, Crosby & Neal*
ATTORNEYS March 5, 1935.  M. L. HASELTON ET AL  1,992,945
LIMIT ORDER DEVICE
Filed Nov. 26, 1930  8 Sheets-Sheet 6
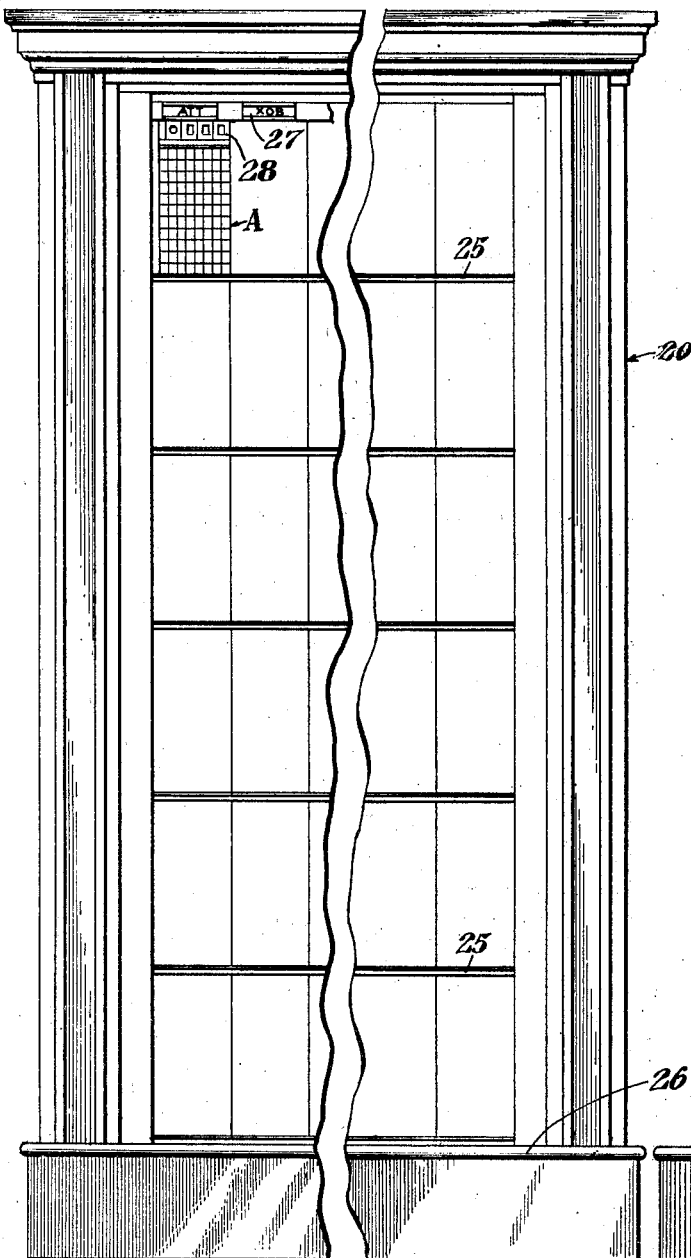
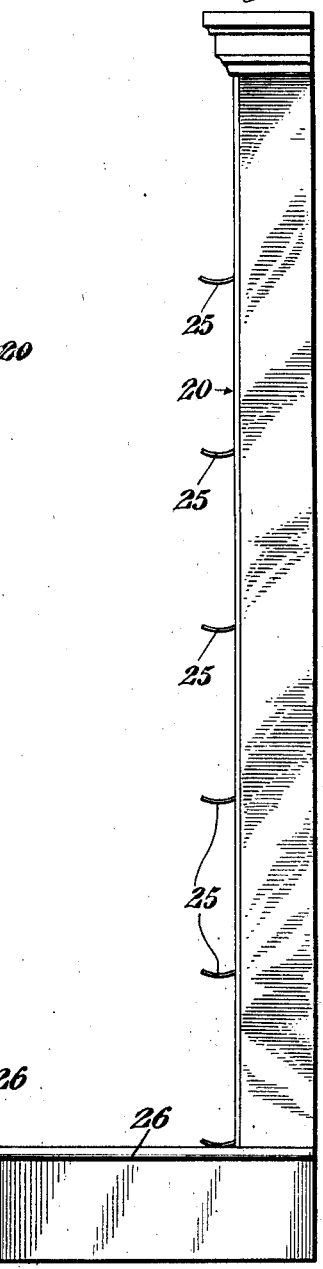
INVENTORS
Merton L. Haselton
Raymond M. Hicks
BY Ward, Crosby & Neal
ATTORNEYS

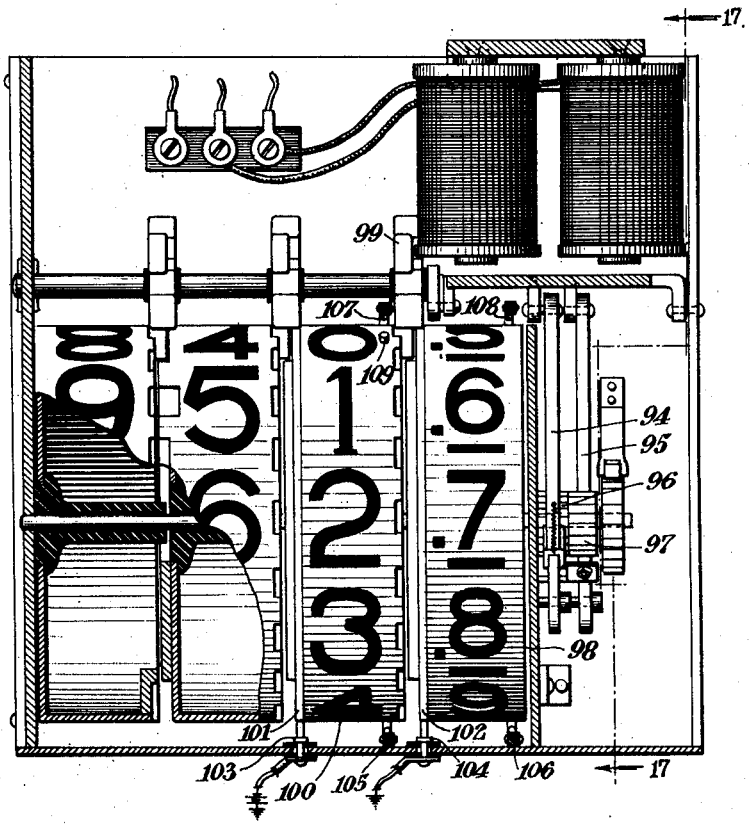
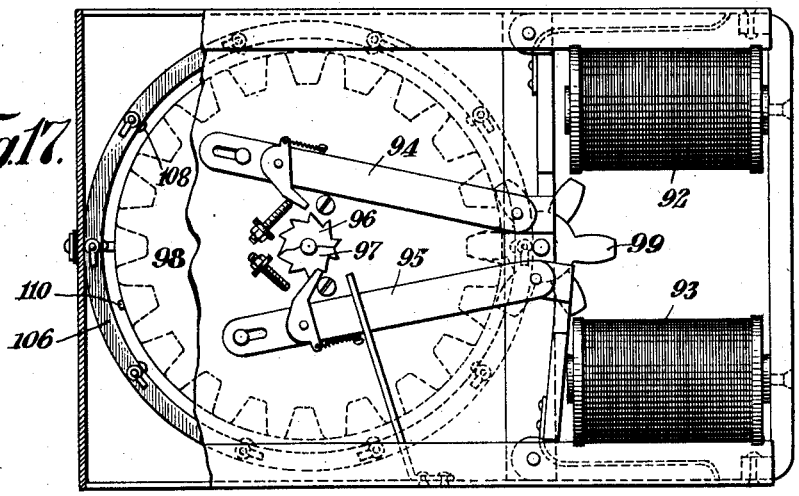

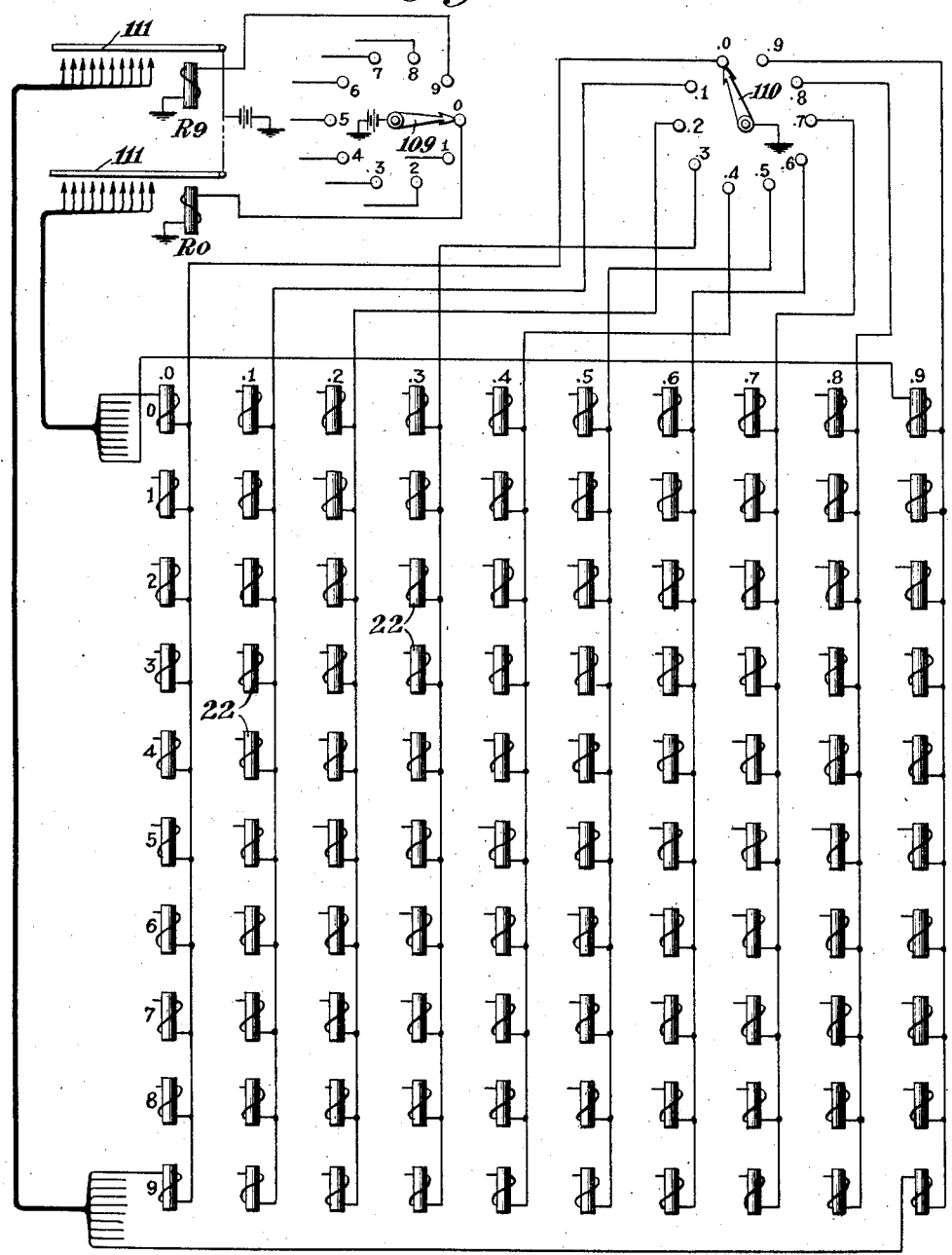

Patented Mar. 5, 1935

1,992,945

UNITED STATES PATENT OFFICE 1,992,945

LIMIT ORDER DEVICE

Merton L. Haselton, Rye, N. Y., and Raymond M. Hicks, Plainfield, N. J., assignors to The Teleregister Corporation, New York, N. Y., a corporation of Delaware Application November 26, 1930, Serial No. 498,216

9 Claims. (Cl. 177—353)

This invention relates to limit order, or numerical comparator, devices; and particularly to devices of this character for use in brokerage houses or the like.

In the transaction of stock business, orders are placed with the broker to buy or to sell stock at certain specified prices, and in the case of margin accounts it becomes necessary to increase the collateral as the price of the stock falls or rises. The price at which stocks are bought or sold and at which the margin is to be increased is usually written on a slip of paper, and when this price is reached as observed on the ticker tape, or automatic stock quotation board, or the like, it is necessary to find all of the slips bearing this price as well as the slips bearing the prices between the last quotation and the quotation immediately preceding.

One of the objects of our invention is to facilitate work of this nature by providing means for automatically delivering all of the slips bearing the last quoted price as the prices are changed.

Another object of this invention is the provision of means for delivering all of the slips bearing prices between the last quotation and the preceding quotation.

Another object of this invention is the provision of such means which can be operated at various distant stations from a central office either by a special transmission system or in conjunction with well known automatic stock quotation systems.

A specific object is the provision of magnetically controlled limit order slip holding means which when energized will release all of the slips between the last and preceding quotations and deliver them to shelves or to an operator's table.

Another object is the provision of improved instrumentalities for delivering limit order slips automatically as price changes are indicated.

These and other objects will appear from the following description of several modifications of our invention disclosed in the accompanying drawings, in which Figs. 1, 2 and 3 show a general wiring diagram of our limit order device;

Fig. 4 shows a combined indicator and limit order slip delivering controlling means;

Fig. 5 is a side view of the commutator taken on the line 5—5 of Fig. 4;

Fig. 6 is a view on the line 6—6 of Fig. 4;

Fig. 7 is a view on the line 7—7 of Fig. 4;

Fig. 8 is a view on the line 8—8 of Fig. 4;

Fig. 9 is a longitudinal section on the line 9—9 of Fig. 4;

Fig. 10 is a section as indicated by the line 10—10 on Fig. 7;

Fig. 14 shows a front view of the cabinet including a plurality of limit order slip receiving and delivering sections;

Fig. 15 is an end view of the cabinet;

Fig. 16 shows in top plan partly in section another form of indicator and limit order slip delivering controlling mechanism;

Fig. 17 is a view taken on the line 17—17 of Fig. 16; and

Fig. 18 shows a wiring diagram for use in connection with the indicator and limit order slip delivering controlling mechanism shown in Figs. 16 and 17.

The indicator portion of the mechanism shown in Figs. 4 to 10 may be of the same construction as that shown in the application of Merton L. Haselton, Serial No. 423,599, filed January 27, 1930, except that the indicator drum is made shorter so as to provide space for a rotary switch which controls the slip delivering mechanism, as will be set forth later.

The mechanism in these figures is also generically the same as that shown in the application of Merton L. Haselton, Ser. No. 276,883, filed May 11, 1928, in which is shown a wiring diagram by means of which the "open", "high", "low" and "last" indicators of any number of a large number of stocks may be selected, automatically forwardly turned to "blank" position, and then turned forwardly to indicate the new quotation.

In the application of Raymond M. Hicks and Everett Leroy, Serial No. 455,217, filed May 24, 1930, there is shown a complete transmitting and receiving mechanism by means of which any one of a large number of stocks may be selected, in which the various ranges of the selected stock may be operated in combination, and in which provision is made for automatically turning all the selected indicators forwardly to "blank" by automatically transmitting from an impulsing means in the receiving station ten impulses after which mechanism comes into operation to transmit actuating impulses which are terminated under the control of storage mechanisms when the indicators have been moved to indicate the new price.

The embodiment which we have disclosed in

Figs. 1 to 15 may be connected in parallel with any chosen indicators shown in the application last referred to, so that our mechanism may be used supplementary to the usual stock quotation board. It is obvious, however, that our mechanism could be used independently of any stock quotation board and that the selection and operation of the indicators shown in Figs. 4 to 10 could be effected in the same way as is done in said applications or by other means.

Figure 12:
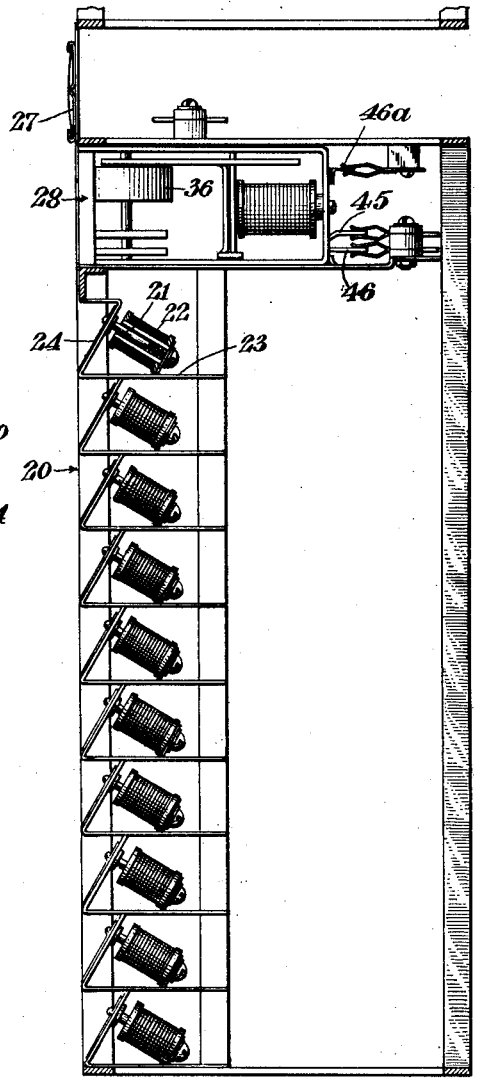
Fig. 12 is a side view of Fig. 11 partly in section.
Figure 13:
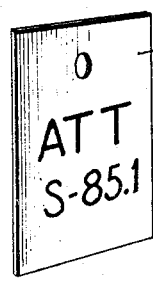
Fig. 13 shows one form of limit order slip.

As shown in Fig. 14, the slip retaining devices may be suitably mounted in a cabinet 20 which is provided with any desired number of sections A each of which includes a number of slip retaining devices each of which, as shown in Fig. 12, may consist of a spring-pressed core 21 of a solenoid 22. The core extends through a frame member 23 and on its projecting end supports any desired number of limit order slips 24. It is obvious that if the solenoid 22 is energized and the core 21 is retracted that the slips 24 will be released. If desired, supports or shelves 25, Figs. 14 and 15, may be provided to receive these slips or in certain constructions these supports may be omitted and the slips may be allowed to drop on to the base 26 of the cabinet.

Figure 3:
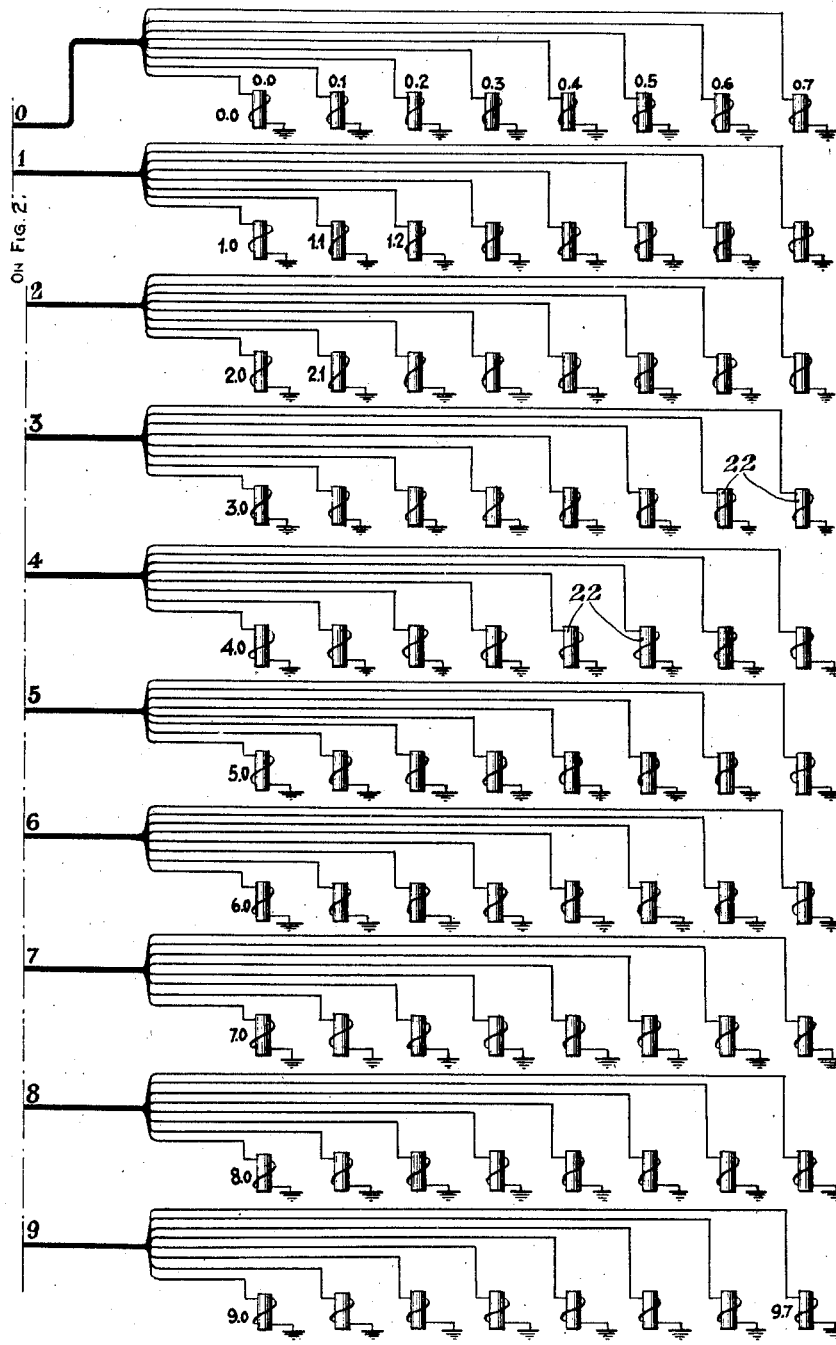
Figure 11:
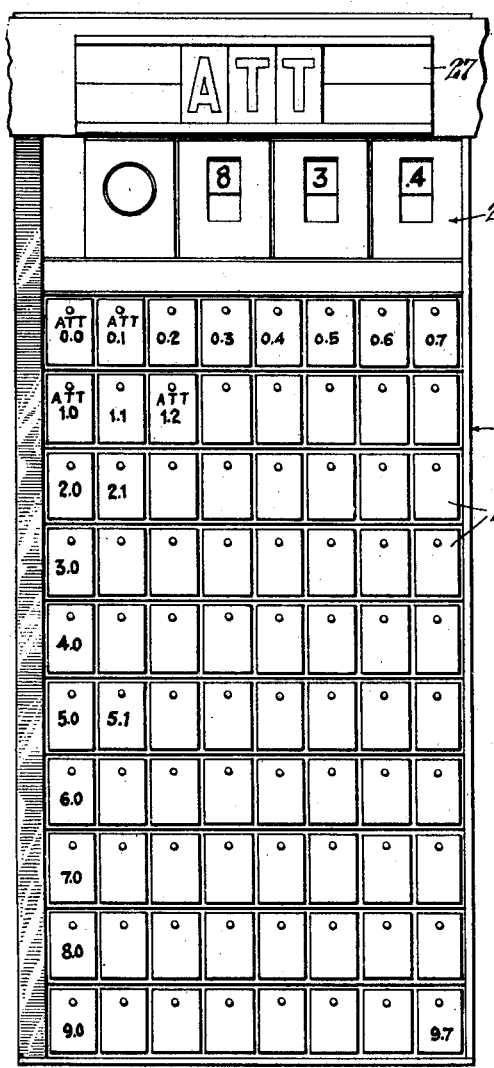
Fig. 11 shows a front view of our limit order slip receiving and delivering cabinet for one stock.

As shown in Figs. 3 and 11, each section may include eighty retaining devices which in a horizontal direction correspond to fractions in eighths and in a vertical direction correspond to units. As will be shown later, the various solenoids 22 may be under control of the units and fractions indicator wheels.

Supported on the top of each section in any suitable manner is a series of indicator units which may include the tens, units and fractions indicators to indicate this portion of the price of the stock. The means for controlling the limit order slip retaining means may be associated with the units and fractions indicators of said series of indicator units.

The main cabinet above the units may be provided with a holding means 27 for tags bearing the abbreviation of the stock to which the associated section is allotted.

Fig. 12 shows one of the indicator units 28 in position in the cabinet and indicates a slip connection between this unit and the cabinet and the wiring system operating the unit.

The indicator mechanism which we have disclosed in Fig. 4, and which is described specifically in application Serial No. 423,599, includes a frame 30 in which is supported a magnet 31 cooperating with a pivoted armature 32 integral with an actuating fork 33 which cooperates with a ratchet wheel 34 on a shaft 35 suitably mounted in the frame 30 and supporting the indicator cylinder 36 and a commutator 37, said shaft preferably being grounded to the frame of the cabinet by means of the springs 38 and 39.

The commutator 37 includes an interrupted disk 40 with which cooperates a brush 41 in each of the positions 1 to 9 and 0 but not in the blank position. The commutator also includes a disk 42 which is provided with a sector-shaped piece 43 occupying the part of the interrupted portion in the disk 40 which cooperates with the brush 41 when the indicator is in the blank position. The disk 40 is in electrical connection with the shaft 35. Cooperating with the disk 42 is a brush 44.

In the systems described in the applications referred to, when the selection of any particular set of indicators has been made and restoring impulses are transmitted these impulses come in over the clip 45, continue over the coil of the magnet 31, across the brush 41 to the commutator 40 in case the indicator is in any position but the blank position, and then continue through the shaft 35 and the spring contacts 38 and 39 to the frame of the cabinet and to ground. As the ten restoring impulses are sent in, the indicator will be stepped forwardly until the contact between the brush 41 and the disk 40 is broken which causes the indicator, which is then in the blank position, to remain in this position during the continuation of the restoring impulses.

After restoraton has been completed of all the indicators selected, ground will be applied to the clip 46 of each selected indicator unit so that the first actuation impulse which comes in over the clip 45, over the coil of the magnet 31 and the brush 41, will continue over the sector 43, the disk 42, the brush 44, and the clip 46 to an actuation ground which has been applied to the wire connected to this clip. The remainder of the actuation impulses will then cause the indicators to move forwardly to indicate the new price, continuing to ground as in the case of the restoration pulses.

Figure 1:
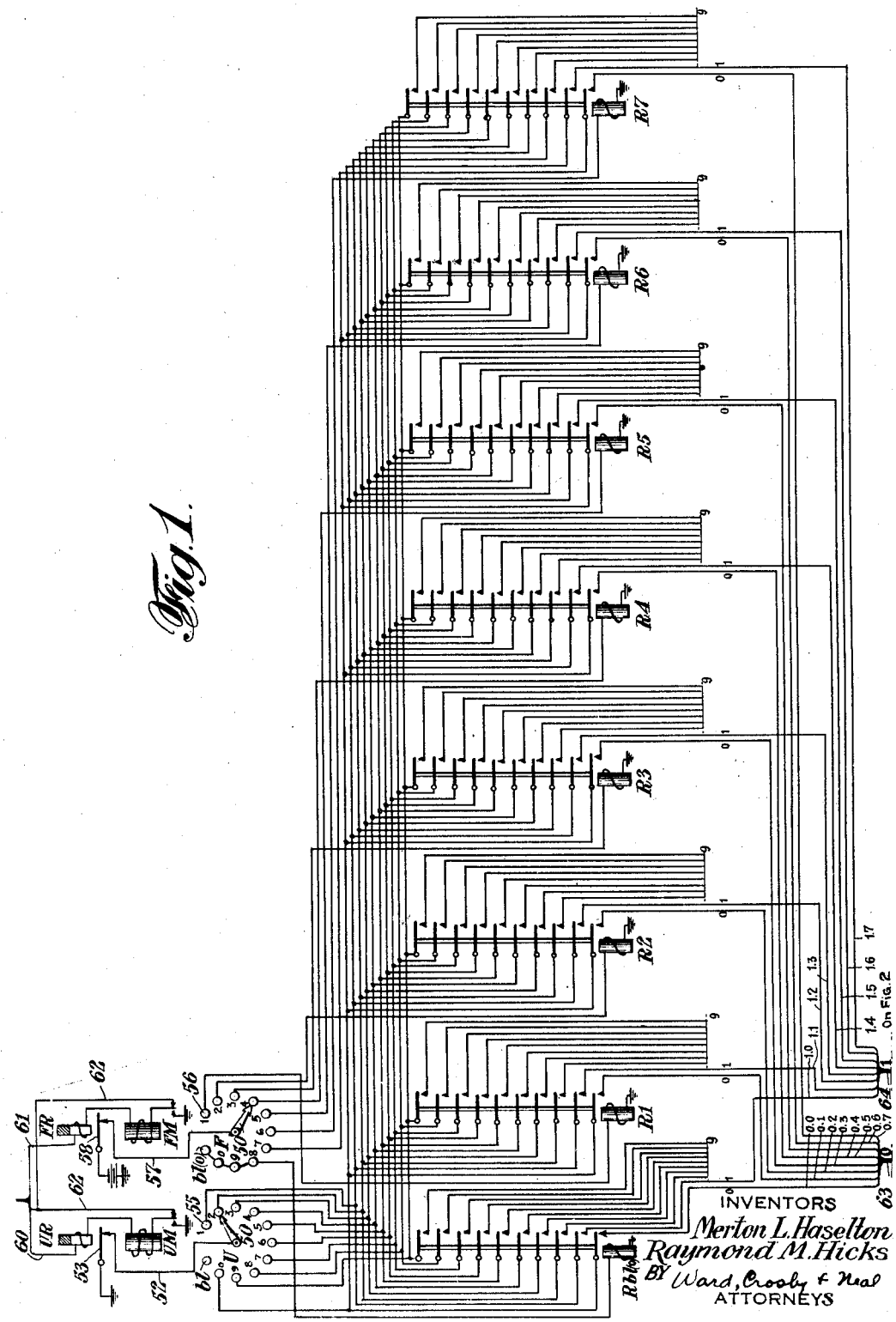

The disclosure in Figs. 4 to 10 differs from that of application Serial No. 423,599 in that the indicator cylinder is made shorter to provide space for a rotary switch mechanism which we employ to control the delivering of the slips from the cabinet. This rotary switch mechanism includes a rotary arm 50 which is mounted for movement with the shaft 35 and is insulated therefrom as indicated. This rotary arm is provided with a spring fork end one prong of which cooperates with an insulated contact ring 51 which is connected, in the case of the units indicator, by a wire 52, Fig. 1, across a break contact 53 of a relay UR to ground. The reason for this construction will be brought out later. The other prong of the fork cooperates with a series of contacts 55 in the positions 1 to 9 and 0 of the units indicator, as indicated in Fig. 1. These contacts are suitably insulated from a supporting plate 55' as shown. As the units price of a stock is generally always indicated whenever the price of the stock is indicated there is no contact provided in the blank position.

In the case of a fractions indicator in which fractions are indicated in eighths the fixed contacts include contacts 1 to 7 designated by 56, and the contacts 8, 9, 0 and blank, Fig. 1, which are all connected together. In case there are no fractions it may be desirable to indicate this fact by showing a 0 in the fractions position or by blanking it or by showing an 8. The insulated contact ring 51 in the case of the fractions indicator is connected by a wire 57 (Fig. 1) across a break contact 58 of the relay FR to battery and ground. The relays UR and FR are slow-to-release relays and are provided for a purpose which will appear obvious from the following description.

As a stock is selected the impulsing lines 60 and 61, Fig. 1, are connected to impulsing means, such as shown in the applications referred to, and restoring impulses are first sent over these lines to the operating magnets UM and FM for the units and fractions indicators U and F. The impulses across the windings of the relays UR and FR cause these relays to pick up and to break the circuit connections to the contact rings 51 in the units and fractions indicators at the contacts 53 and 58. These relays are made slow-to-release so that the circuit connections will be broken throughout the entire restoring and actuation period and also during the interval between the restoring and actuation period. As the impulses continue, the operating magnets UM and FM move their respective indicators to "blank" position and their switch arms 50 to the "blank" position. After all the selected indicators have been moved to the "blank" position a ground for the actuation circuits is provided, as shown in said applications, over the wires 62, Fig. 1, connected to the clips 46, Fig. 4, so that the actuating impulses may move the indicators from the "blank" position to the "one" position and then on to the position in which they indicate the new price.

After the indicators have been moved forwardly to indicate the new price and the impulses have ceased the relays UR and FR will release and apply ground and grounded battery respectively to the lines 52 and 57. Battery on the line 57 continues across the arm 50 of the fractions indicator to one of the contacts 1 to 7, or 8, 9, 0 and "blank", across the line connected to the respective contact, and across the winding of the respective multicontact relay of the relays indicated by R$b$1 (0) and R1 to R7, to ground.

Figure 2:
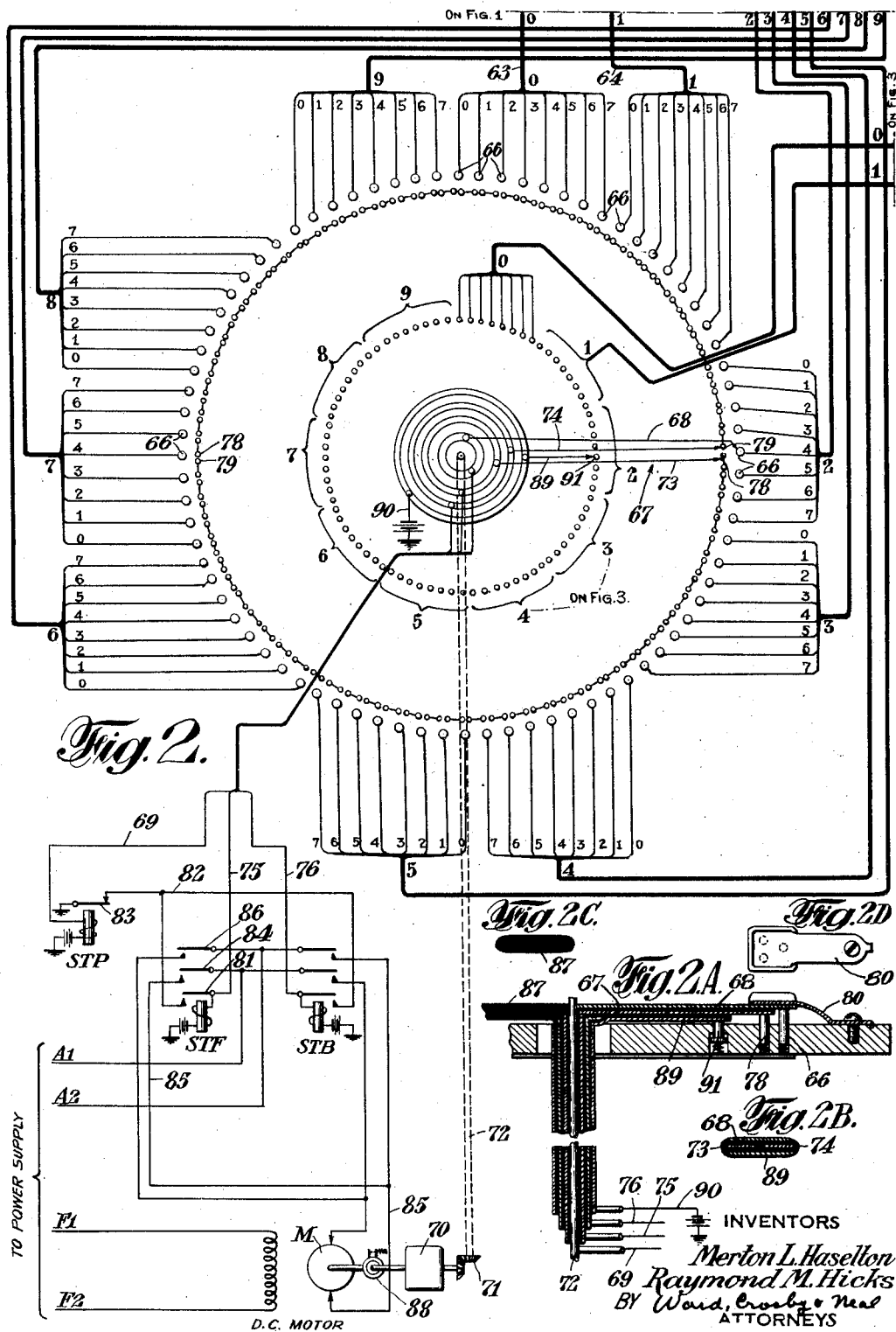
Figs. 2a, 2b, 2c and 2d show details of the rotary switch in Fig. 2.

The ground on line 52 continues across the arm 50 of the units indicator and one of the contacts 1 to 9 and 0 and across the corresponding contact of the multiplied contact relay energized, to one line in one of the groups of lines extending toward the bottom of this figure. Slip connections 46$a$ similar to clips 45 and 46 may, as indicated in Figs. 4, 9 and 12, be provided in the lines 52 and 57 and the lines connected to the contacts 55 and 56, Fig. 1, so that the indicator unit may be readily removed and replaced as is well understood. Of these various lines, the lines 0.0, 0.1 to 0.7 corresponding to the prices 0.⅛ to ⅞, and lines 1.0, 1.1 to 1.7 corresponding to the prices 1, 1.⅛ to 1.⅞, have been shown as cables 63 and 64 which are continued to Fig. 2 in which these lines are connected to fixed contacts 66 of which there are ten sections of eight contacts each. The other cables from Fig. 1, with which are associated the units price numerals 2, 3, 4, 5, 6, 7, 8 and 9 in Fig. 2, are connected to various other sections of contacts as indicated in Fig. 2. Through one of these contacts 66, Fig. 2$a$, with which the rotatable switch arm 67 may engage, ground from the contact 53, Fig. 1, continues over line 52, arm 50, across one of the contacts of the multicontact relays in Fig. 1 and across a line associated with this contact 66, and continues across the conductor 68 of this arm to the line 69 which is the ground terminal for the stop relay STP, Fig. 2, to the other terminal of which battery and ground are connected. The function of this stop relay is to interrupt the current to the motor M which is the driving means for the arm, this being for the purpose of arresting the arm in the position corresponding to the indication set up on the indicators.

The motor M is a direct current motor and is provided with a constant field, the circuit from the power supply being indicated at F1, F2. The shaft of the motor operates through a gear connection in a gear box 70 and gears 71, the shaft 72, to which the arm 67 is secured. For the purpose of controlling the movement of the motor either forwardly or reversely to move the arm 67 directly from a position corresponding to the old price to a position corresponding to the new price, the arm 67 is also provided with conducting arms 73 and 74, Figs. 2 and 2$b$, provided with contact rings or cylinders cooperating with brushes which are connected by wires 75 and 76 to the ground terminals of relays STF and STB, to the other terminal of which battery and ground are connected.

If we assume that the arm 67 is in the position indicated in Fig. 2, and that the new price is higher than the preceding price, battery will continue across the coil of the relay STF, line 75, the arm 73 and a contact 78 of the pair of contacts 78 and 79, and in a clockwise direction across the various clips 80, Figs. 2$a$ and 2$d$, which connect the contacts 78 and 79 of adjacent pairs of contacts and through the contact 66 which is grounded over the contact 53 in Fig. 1. The electrical connection between contacts 66, 78 and 79 through clip 80 in the position of the arm shown in Fig. 2 is broken by the arm.

As the relay STF picks up it closes a holding circuit for itself across one of its contacts 81 and the line 82 and the break contact 83 of the relay STP to ground so that the relay STF will be held up as long as the relay STP remains deenergized. The relay STF at its contact 84 connects the incoming line A1 of the motor circuit to the line 85 connected to one terminal of the motor, and at its contact 86 connects the return line A2 to the other terminal of the motor thus causing the motor to rotate in a direction to move the arm 67 clockwise.

If the new price were smaller than the preceding price the circuit would be closed from battery over the coil of the relay STB, line 76, arm 73, contact 79 and a series of clips 80 in a counterclockwise direction to the contact 66 grounded over the contact 53, Fig. 1. This would cause the relay STB to pick up and to connect the lines A1 and A2 in a reverse relation with respect to the motor causing the motor to move in the opposite direction thereby driving the arm 67 counterclockwise.

In order that this mechanism may function as described the arm 67 is provided with a rearward extension 87, Figs. 2$a$ and 2$c$, of insulating material and which may be integral with the insulating material between the various conducting members of the arm 67. The end of the arm which cooperates with the clips 80 is as shown in Fig. 2$c$ so shaped that as it is moved it will raise the clips 80 out of contact with the contacts 66, 78 and 79 and break the circuit to ground over contact 53 at this point. The movement of the arm 67 depends upon which one of the relays STF and STB is energized which in turn depends upon which one of the members 73 and 74 is connected to ground over the contact 53 in Fig. 1. The function of the arm 87 is to permit only one of the relays STF and STB to pick up.

The relay STB also closes a holding circuit over one of its own contacts and the contact 83 of the relay STP.

The arm 67 will be moved in one direction or the other by the motor until the arm arrives in a position corresponding to the new setting of the indicators. In this position the conducting strip 68 of the arm 67 engages the grounded contact 66 and through the line 69 applies ground to the relay STP which opens the holding circuit for either of the relays STF or STB which upon release will interrupt the circuit to the motor causing the arm 67 to stop in a position corresponding to the adjustment of the indicators.

For the purpose of preventing overthrow of the arm a drag brake 88 is applied to the shaft, as indicated in Fig. 2.

The arm 67 also includes a wiper arm 89, Figs. 2 and 2a, to which grounded battery is normally applied over line 90 and as this arm 89 is moved it engages contacts 91 which, as shown in Fig. 2, are connected by cables 1 to 9 and 0 to the energizing leads of various solenoids 22 in Fig. 3 which are the solenoids shown in Fig. 12. It will thus be seen that as the arm 67 is moved either forwardly or reversely from a position indicating an old price to a position indicating a new price that various circuits will be completed to various solenoids in Figs. 3 and 12 causing all of the solenoids corresponding to the various prices between the old price and the new price to be energized which in turn causes all of the slips supported upon the cores of these solenoids to be released.

In the embodiment of our invention shown in Figs. 16, 17 and 18, we have shown an arrangement which may be used with indicators of the type shown in Letters Patent of the United States of Merton L. Haselton and Page S. Haselton, No. 1,890,878, December 13, 1932, in which the fractions are indicated in tens and in which the indicators are moved directly forwardly or reversely by the operation respectively of magnets 92 and 93 which operate pawls 94 and 95 cooperating with ratchet 96 and 97 to move the fractions indicator wheels 98 respectively forwardly or reversely. As the fractions indicator wheel is moved to complete one turn, it operates a Geneva mechanism 99 to cause the units indicator wheel 100 to move either forwardly or reversely depending upon the direction of movement of the fractions wheel 98. Similarly, when the units wheel completes one rotation it causes movement of the tens indicator wheel and likewise the movement of the tens indicator wheel causes movement of the hundreds indicator wheel.

The mechanism described above is clearly shown in the patent above referred to and is believed will be clear from the disclosure shown in the accompanying drawings.

For the purposes of this invention the various indicator wheels and the Geneva drives are preferably insulated from each other and from the frame of the indicator, and the units and fractions indicators are provided with contact surfaces 101 and 102 cooperating respectively with fixed contacts 103 and 104 respectively connected to grounded battery and to ground as is also indicated by grounded battery and ground applied to arms 109 and 110 in Fig. 18, and suitably mounted and insulated with respect to the frame as disclosed. Cooperating with the units and fractions indicator wheels are insulating rings 105 and 106 which carry contacts 107 and 108 cooperating with pins 109 and 110 on the indicator wheels. These pins are shown as arms in Fig. 18. Wires are connected to these contacts as shown in Fig. 18 to control the energization of the relays in this figure.

Battery on the contact 103 while the pin 110 is in contact with any of the ten contacts 107 draws up a corresponding multicontact relay R0 to R9 which applies battery over its multicontact switch 111 to each of the ten fractions relays in a horizontal row of relays corresponding to this multicontact relay.

Ground on the contact 104 when the pin 110 is in contact with any of the ten contacts 108 extends to one of the lines 1 to 9 and 0 at the right of Fig. 18 which are the ground lines for corresponding vertical rows of solenoids. With the pins 109 and 110 in any given position the solenoids corresponding to such position will be energized thus delivering the slips supported by the core of said solenoid.

If we assume that the pins are in the position shown in Fig. 18, and that the next price change is an advance of three-eighths, the pin 110 will move into the third position and as it moves over the contact 1 it will cause the corresponding solenoid to deliver slips corresponding to that price, and as it moves over the contact 2 it will cause the corresponding slips to be delivered, and as it moves into contact with contact 3 it will cause the corresponding slips to be delivered.

If the fractions contacts were in a position over the 9 contact, and the units pin in the position shown, and if the price change were at advance of one-tenth, the fractions pin would be moved from contact 9 to the contact 0 and at the same time the pin 109 of the units indicator would be moved from 0 contact to the 1 contact thus causing a relay corresponding to the price of one and no tenths to be energized to deliver the slips retained by the core of said relay. Similarly, if the old price were one and no tenths and the new price were nine-tenths, the solenoid corresponding to nine-tenths and no units would be energized.

It will thus be seen that in connection with indicators which are operated directly forwardly or reversely from the old position to the new position our structure may be accordingly simplified as shown in Figs. 16, 17, 18.

While we have shown various ways of energizing the delivering solenoids corresponding to the possible quotations between the old and new quotations, successively by means depending upon impulses which may control indicators which are set directly from the old price to the new price, or which are first moved to the blank position and then moved forwardly to the new price, it is obvious that arms 50 in Fig. 1 and the pins 109 and 110 in Fig. 18 could be operated by hand according to information obtained from the tape, or from an automatic stock quotation board, or by telephone, or in any other manner.

While we have described our invention in connection with a disclosure of two embodiments, it is obvious that our invention may take other forms and that these forms as well as variant features of construction will be apparent to those skilled in the art, and accordingly we do not desire to be limited to the details illustrated and described.

What is claimed is:

1. In a limit order system, the combination of a plurality of slips bearing various of the prices of an item intermediate of old and new prices, means settable in accordance with the fluctuating prices of an item, and means operable under control of said settable means when set for calling attention to slips bearing prices intermediate of the old and new prices.

2. The combination of at least two settable devices adapted to be moved into positions corresponding to the lowest denominational elements of a new price, limit order slip retaining means for retaining slips bearing various possible prices of an item, electromagnetic means for operating said retaining means, fixed contacts with which said settable devices cooperate, circuit connections made over said settable devices and fixed contacts after said devices have been set to show the new price, and means under control of said circuits made over said settable devices for establishing circuits to the electromagnetic devices controlling the retaining means retaining slips bearing prices between the new and old prices of said item.

3. The combination of a set of indicators including means whereby they are adapted on each price change to be moved into blank position and then to be adjusted forwardly to represent a new price, a plurality of limit order slip retaining means, means operable after said indicators have been adjusted to show the new price for releasing all of the limit order slips bearing prices between the new and old prices, said means comprising a movable switch arm and a plurality of magnets controlling said slip retaining means, and means for moving said switch arm under control of said indicators from a position representing the old price to a position representing the new price, said switch arm operating said magnets in succession as it moves from one position to another.

4. The combination of a plurality of limit order slip electromagnetically operated retaining means corresponding to combinations of units and fractions price changes within a predetermined limit, a multi-position switch having contacts corresponding to said combinations of units and fractions price changes for controlling said retaining means, means adapted to be restored to home position and then adjusted in accordance with the new price, and means under control of said first mentioned means for moving said multi-position switch directly from a position corresponding to the old price to a position corresponding to the new price.

5. The combination with a plurality of means for retaining and delivering limit order slips bearing the name of a stock and the prices at which a certain number of shares are to be bought or sold or at which the margin is to be increased, electromagnets individual to said means for operating said means, circuits for said electromagnets, and means responsive to impulses representative of the new price of the stock and movable directly forwardly or reversely as required from a position representative of the old price to a position representative of the new price and operating to successively close circuits over the electromagnets controlling the retaining and delivering means which retain slips bearing intermediate prices.

6. The combination of a set of indicators including means whereby they are adapted on each price change to be moved into blank position and then to be adjusted forwardly to represent a new price, electrically operated limit order slip retaining means for retaining slips bearing various possible prices of an item, and means operable after said indicators have been adjusted to show the new price for establishing circuits to all of said electromagnetically operated limit order slip retaining means, retaining slips bearing prices between the new and old prices, said second mentioned means including a brush, a series of co-operating fixed contacts over which said circuits are established and means under the control of said indicators for moving said brush forwardly or reversely over said contacts, said last mentioned means comprising an electric motor together with means under control of said indicators for controlling the direction of rotation of said motor.

7. In a mechanism of the character described, the combination of a pair of settable devices each corresponding to an element of a price, said settable devices being movable into positions corresponding to such elements of a price, fixed contacts cooperating with said settable devices, a number of multicontact relays corresponding to the number of positions of one of said settable devices, circuits adapted to be made over said settable device and its contacts to operate said relays, circuits adapted to be made across the other of said settable devices and each of its contacts to a contact in each of said relays, said circuits being adapted to be connected across the contacts of the operated relay to circuits each of which corresponds to the price represented by said settable devices, a plurality of slip retaining devices each corresponding to said last mentioned circuits, and means under control of said last mentioned circuits for operating all of the retaining devices corresponding to all of the prices between the price previously set up on said settable devices and the new price set up on said settable devices.

8. The combination of a set of commodity price indicators including means whereby they are adapted on each price change to be moved first forwardly into blank position and then forwardly to represent the new price, limit order slip retaining means, and means controlled by the indicators and operable after said indicators have been adjusted to show the new price for releasing from the retaining means all of the limit order slips bearing prices between the new and old prices.

9. The combination of a set of settable devices including means whereby each is adapted on a price change to be moved into blank position and then to be adjusted forwardly to represent a digit of a new price, a plurality of limit order slip retaining means corresponding to various prices, means operable after said settable devices have been adjusted to positions corresponding to a new price for operating all of said retaining means corresponding to the various prices between the new and old prices, said means comprising a plurality of electromagnets controlling said slip retaining means and a movable switch arm for successively closing circuits over said electromagnets, and means under control of said settable devices for moving said switch arm from a position representing the old price to a position representing the new price.

MERTON L. HASELTON.
RAYMOND M. HICKS.